3,504,004
FERRIC HYDROCARBON-AMMONIUM SALTS AND THEIR PREPARATION
Leo Roos, New Shrewsbury, N.J., assignor to E. I. du Pont de Nemours and Company, Wilmington, Del., a corporation of Delaware
No Drawing. Filed Nov. 2, 1967, Ser. No. 680,013
Int. Cl. C07f 15/02; G03c 1/64
U.S. Cl. 260—439          5 Claims

ABSTRACT OF THE DISCLOSURE

Tris (hydrocarbons-ammonium) iron (III) oxalates, citrates and tartrates are produced by reacting suitable metal carboxylates with alkyl or aryl ammonium halides. Very pure complexes are obtained which are light-sensitive and may form useful images.

BACKGROUND OF THE INVENTION

Field of the invention

This invention relates to new ferric hydrocarbon-ammonium carboxylate complexes which are sensitive to actinic radiation and have utility in the photographic art and in other fields. It also relates to processes for preparing said compounds.

Description of the prior art

Ferric ammonium oxalates and citrates are known, as are the ferric complexes of sodium and potassium. These complexes are light-sensitive and have been used to make blueprint coatings and vesicular print coatings. These latter coatings depend on the decomposition of the ferric polycarboxylate complexes by the action of light to form carbon dioxide gas which forms a vesicular or light-scattering image.

While the prior complexes can be used to make satisfactory photographic images of the vesicular type, they have some disadvantages. In order to operate in aqueous systems it is necessary that the binder system be composed of a substantial amount of gelatin which apparently aids in incorporating a sufficient amount of, for example, ferric ammonium oxalate into the system to provide a good light-sensitive element. As has been recognized in the art, gelatin is extremely water-sensitive and this, in turn, tends to destroy or cause any vesicular images formed therein to fade rapidly. This is caused in part by the tendency of gelatin to absorb moisture. Attempts to modify gelatin with synthetic water-soluble colloids or dispersions of water-insoluble colloids have not proven satisfactory. Also, even with the use of aqueous gelatin systems, only a limited amount of the above complexes can be incorporated in the system. The above complexes can be incorporated with water-soluble synthetic binders in organic solvent systems but they have a high tendency to crystallize out and thus cannot be coated as a homogeneous layer. They also have slow photographic speed. The ferric hydrocarbon-ammonium carboxylate complexes of this invention are free from the disadvantages described above.

SUMMARY OF THE INVENTION

This invention pertains to new ferric substituted-ammonium carboxylate complexes which are extremely light-sensitive and to a process of preparing them. The complexes comprise ferric hydrocarbon-substituted ammonium oxalates, citrates and tartrates.

DESCRIPTION OF PREFERRED EMBODIMENTS

The novel complexes of this invention can be represented by the formula

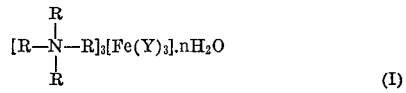

wherein 1 to 4 of the radicals R is alkyl of 4 to 20 carbon atoms, cycloalkyl of 6 to 12 carbon atoms, aryl of 6 to 14 carbon atoms, aralkyl, e.g., benzyl or naphthylmethyl or alkaryl wherein alk contains 1 to 4 carbons and aryl contains 6 to 14 carbon atoms, and any remaining radicals R is hydrogen, and each of the 3 radicals Y is an oxalate, citrate or tartrate anion.

Suitable specific alkyl radicals include methyl, ethyl, propyl, hexyl, heptyl, octyl, decyl, dodecyl, hexadecyl and octadecyl. The aryl radicals can be phenyl, naphthyl, anthryl or phenanthryl.

Suitable cycloalkyl radicals include cyclohexyl, cycloheptyl and cyclooctyl. Among the useful alkaryl radicals are tolyl, xyly, ethyphenyl, propylphenyl, butylphenyl and dodecylphenyl.

The novel complexes can be made in accordance with the invention by reacting an appropriate alkyl-, cycloalkyl-, aryl-, aralykyl- or alkarylammonium chloride, bromide or iodide in an aqueous medium, e.g., in water or a water-ethanol solution with an oxalate, citrate, or tartrate of a metal that forms an insoluble salt, more particularly a silver oxalate, citrate or tartrate. The insoluble metal salt that is formed is separated, usually by filtering the precipitate, from the quaternary ammonium compound. The latter compound is then reacted with an appropriate ferric salt, e.g., ferric sulfate, in an aqueous ethanol solution to form the desired ferric hydrocarbon-substituted-ammonium carboxylate complex. Ferric sulfate can be used with barium chloride to form the complex. The reactions may be carried on simultaneously, that is, the hydrocarbon-substituted ammonium halide, ferric salt and silver carboxylate may be incorporated in the reaction solution.

The complexes are soluble in organic solvents and compatible with a great number of organic solvent-soluble synthetic polymers, e.g., polyvinyl esters, polyamides, etc., so that image-forming layers can be coated from the solutions onto a film, foil or paper sheet.

The invention will now be illustrated in and by the following Examples but is not intended to be limited thereby.

EXAMPLE I

Tris(tetra-n-butylammonium)Iron(III)oxalate

Sodium oxalate (40.2 grams) was dissolved in 700 ml. of water which were slowly added 50.7 grams of silver nitrate. The resulting white precipitate of silver oxalate was filtered and wasrhed several times with distilled water. Sixteen grams of silver oxalate were added to 18 grams of tetra-n-butylammonium iodide in 100 ml. of water and 50 ml. of methyl alcohol. The solution was stirred overnight. The yellow precipitate of silver iodide which formed was removed by filtration and the filtrate reduced in volume under vacuum.

The clear solution of tetra-n-butylammonium oxalate was then reacted with 20 grams of barium chloride, 10 grams of sodium oxalate and 25 grams of ferric sulfate. The reaction mixture was warmed and stirred for 24 hours during which the solution turned green. The precipitate of barium sulfate was removed and the solution reduced in volume until the tris(tetra-n-butylammonium)-iron(III)oxalate crystallized out. The crystalline material was then reacted with 20 grams of barium chloride, 10 times more soluble in organic solvents, e.g., methyl ethyl ketone, methanol, ethanol, and diethyl ether than ferric ammonium oxalate.

EXAMPLE II

Tris(hexadecylammonium)iron(III)citrate

Hexadecylamine (120 grams) was placed in a three-neck flask containing 2000 ml. of n-octane. The flask was equipped with a thermometer, stirrer and a gas inlet tube plus a reflux condenser. After the amine was dissolved, sufficient anhydrous hydrogen chloride gas was added to give a quantitive yield of a white precipitate of 138.2 grams (94% theoretical).

The resulting amine hydrochloride (55 grams) was dissolved in 500 ml. of a 70% ethanol–30% water solution. To this was added 154 grams of freshly prepared silver citrate. The solution was stirred for 24 hours, and then filtered. The filtrate was reduced in volume under vacuum and 88 grams of a white, pasty material was recovered. Ferrous carbonate was prepared by dissolving 35.5 grams of ferrous sulfate in 1000 ml. of water and adding thereto 800 ml. of water containing 16 grams of sodium carbonate. A grey precipitate formed which was recovered by filtration. The recovered material was washed with ice cold water. The material was then placed in 1000 ml. of water to which there was added 38 grams of citric acid. Immediately thereafter the hexadecylammonium citrate was added and the mixture was rapidly stirred for 24 hours. At the end of this time there was recovered 78 grams of a green pasty material which was light-sensitive and organic solvent soluble. The structure of the compound was confirmed by infrared spectroscopy.

EXAMPLE III

Tris(trioctylammonium)iron(III) oxalate

Trioctylamine hydrochloride (25 grams), 15 grams of barium chloride, 11.8 grams of ferric sulfate and 38.7 grams of freshly prepared silver oxalate were added to 300 ml. of a mixture of 150 ml. of 95% ethanol and 150 ml. of water. The mixture was warmed to 50° C. while stirring and held at that temperature for 2 hours. A transient green color formed which then turned yellow. A yellow oil formed which was recovered. The material was soluble in benzene, chloroform, acetone, methyl ethyl ketone and ethyl acetate. Infrared spectrascopic analysis confirmed the structure of the compound. The material was also very light-sensitive and could be used in a vesicular photographic system.

EXAMPLE IV

Tris(trihexylammonium)iron(III) oxalate

Trihexylamine hydrochloride (25 grams), 15.6 grams of barium chloride, 11.8 grams of ferric sulfate and 38.7 grams of freshly prepared silver oxalate were added to a 50-50 solution of 95% ethanol and water. The solution was warmed to 50° C. while stirring and held at this temperature for two hours. A transient green color formed which then turned yellow and a yellow oil separated out which was recovered. The oil was soluble in the same solvents listed in Example III. The structure was confirmed by infrarerd spectroscopic analysis. A comparison of light-sensitivity showed that more than 60-seconds exposure to light from Sylvania SQ-60 Sun Gun (1000-watt) were required to change ferric ammonium oxalate from green to black while only 20 seconds were required for tris(trihexylammonium)iron(III) oxalate.

EXAMPLE V

Tris(hexadecylammonium)iron(III) oxalate

Hexadecylamine (50 grams) was dissolved in 800 ml. of n-octane. While the solution was stirred rapidly, anhydrous hydrogen chloride was bubbled through the solution until no further precipitate was formed. To 500 ml. of water in a flask there was added 50 grams of freshly prepared silver oxalate, and 18 g. of ethanol containing 28 grams of hexadecylamine hydrochloride. The solution was stirred and warmed to 70° C. and held at this temperature for 1 hour; 17 grams of ferric sulfate were added during this time. The mixture turned green after the addition of the ferric sulfate. Upon evaporation organic solvent-soluble green crystals were obtained. The melting point by differential thermal analysis was 57° C. The structure was confirmed by infrared spectroscopy.

EXAMPLE VI

Tris(N,N'-dipropylanilinium)iron(III) oxalate

N,N-dipropylaniline (25 grams) was reacted in ether with anhydrous hydrogen chloride to form a white precipitate which was recovered. Then 23 g. of this material were dissolved in 300 ml. of ethanol and 200 ml. of water. To this 28 grams of barium chloride 67 grams of silver oxalate and 21 grams of ferric sulfate were added. The mixture was warmed to 50° C. and stirred for one hour during which time it turned green. The reaction mixture was filtered to remove the precipitated barium sulfate and silver chloride and the filtrate was evaporated to dryness under vacuum. A yellow-green oily material remained. This was repurified from a methanol-water solution to give a green paste which was soluble in methanol, acetone and mixtures thereof. Infrared spectroscopic analysis confirmed the structure of the compound. The compound was very light-sensitive and turned yellow on exposure to white fluoroescent light.

EXAMPLE VII

Tris(triheptylammonium(iron)(III) oxalate

Triheptylamine hydrochloride (25 grams), 15.6 grams of barium chloride, 11.8 grams of ferric sulfate and 28.7 grams of freshly perpared silver oxalate were added to 300 ml. of a 50–50 95% ethanol-water mixture. The mixture was warmed to 50° C. while stirring and held at that temperature for two hours. A transient green color formed which then turned yellow. A yellow oil formed which was recovered. The material was soluble in benzene, chloroform, acetone, methyl ethyl ketone and ethyl acetate. Infrared sepctroscopic analysis confirmed the structure of the compound.

Using the tris(triheptylammonium)iron(III) oxalate obtained above, an emulsion was made in the following manner.

Gelatin (20 grams) was dissolved in 280 ml. of water. After warming to about 45° C., 2.8 grams of potassium ferrocyanide and 1.8 grams of potassium ferricyanide were added to the gelatin mixture. A solution of 15 grams of tris(triheptylammonium)iron(III) oxalate in 25 ml. of ethyl acetate was added together with .2 g. of 2-ethylanthraquinone and the mixture was blended for 5 minutes in an explosion-proof high-speed liquid blender of the type disclosed in Oster U.S. 2,109,501. The ethyl acetate was removed under vacuum and the resulting emulsion was coated on a copolymer-coated polyethylene terephthalate film support of the type described in Alles U.S. 2,627,088 and dried in a conventional manner. A similar emulsion which did not contain the 2-ethylanthraquinone was also coated. Strips of the coated material were exposed for 30 seconds through a √2 sensitometric step wedge to actinic light from a Sylvania SQ-60 Sun Gun (1000-watt) at a distance of 16 inches. Immediately after exposure the films were dipped in water and a strong blue color of an image of the wedge formed in the exposed areas of the strips. The strip coated with the emulsion not containing the 2-ethylanthraquinone printed only the first step of the wedge. The strip coated with the emulsion containing the 2-ethylanthraquinone showed an image of 4 √2 steps.

The invention, as is apparent from the above examples, is useful for making organic solvent-soluble ferric substituted ammonium carboxylate complexes which are more light-sensitive than the conventional sodium, potassium and ammonium complexes.

The compounds are compatible with many organic solvent soluble synthetic polymers with which they may be mixed to form coating compositions for highly efficient vesicular image elements, as set forth and claimed in my copending application U.S. Ser. No. 680,013 filed Nov. 2, 1967.

When the novel ferric substituted-ammonium carboxylate complexes of the present invention are incorporated in a synthetic binder such as polyvinyl acetate, a polyamide, etc., there is no tendency for the complexes to crystallize out and produce poor to unstable coatings as is the case with the prior art compounds. They also do not require the presence of water-sensitive gelatin when they are incorporated in the binders in order to get a sufficient quantity in the system to provide a good quality photographic layer.

The embodiments of the invention in which an exclusive property or privilege is claimed are defined as follows:

1. A ferric hydrocarbon-substituted ammonium complex of the formula

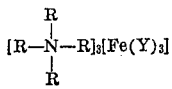

wherein 1 to 4 of the radicals R are alkyl of 4–20 carbon atoms, and the remaining radicals R are hydrogen, or one of the radicals R is aryl of 6–14 carbon atoms, and the remaining radicals R are selected from the group consisting of hydrogen and alkyl radicals of 4–20 carbon atoms, and each of the radicals Y is an oxalate, citrate, or tartrate anioin.

2. A ferric alkyl-substituted ammonium complex of the formula

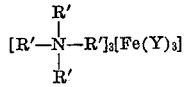

wherein 1 to 4 of the radicals R' are alkyl radicals of 4 to 20 carbon atoms and any remaining radicals R' are hydrogen, and each of the radicals Y is an oxalate, citrate, or tartrate anion.

3. Tris(tetra-n-butylammonium)iron(III) oxalate.
4. Tris(hexadecylammonium)iron(III) citrate.
5. Tris(trihexylammonium)iron(III) oxalate.

References Cited

UNITED STATES PATENTS

| | | | |
|---|---|---|---|
| 2,165,166 | 7/1939 | Ham | 95—6 |
| 2,172,319 | 9/1939 | Ham | 95—6 |
| 2,265,934 | 12/1941 | Barnes | 260—439 |

OTHER REFERENCES

Fieser et al., Organic Chemistry, 3rd ed. (1956), Reinhold Publishing Corp., New York, N.Y., pp. 224–228.

Finar, Organic Chemistry, 4th ed. (1963), Longmans, Green and Co., Ltd., London, pp. 318–389.

TOBIAS E. LEVOW, Primary Examiner

A. P. DEMERS, Assistant Examiner

U.S. Cl. X.R.

96—92

PO-1050
(5/69)

UNITED STATES PATENT OFFICE
CERTIFICATE OF CORRECTION

Patent No. 3,504,004                           Dated  March 31, 1970

Inventor(s) Leo Roos

It is certified that error appears in the above-identified patent and that said Letters Patent are hereby corrected as shown below:

Col. 3, line 7, delete "then reacted with 20 grams of barium chloride, 10" and insert --recovered and was found to be approximately ten--; same col., line 70, change "infrarerd" to --infrared--.

Col. 6, line 7, change "anioin" to --anion--; same col., line 33, change "318-389" to --318 and 389--.

SIGNED AND
SEALED
AUG 25 1970

(SEAL)
Attest:

Edward M. Fletcher, Jr.
Attesting Officer

WILLIAM E. SCHUYLER, JR.
Commissioner of Patents